United States Patent
Weydert et al.

(10) Patent No.: US 11,905,414 B2
(45) Date of Patent: Feb. 20, 2024

(54) RUBBER COMPOSITION AND AN ARTICLE OF MANUFACTURE COMPRISING A RUBBER COMPOSITION

(71) Applicants: THE GOODYEAR TIRE & RUBBER COMPANY, Akron, OH (US); LUXEMBOURG INSTITUTE OF SCIENCE AND TECHNOLOGY, Esch-sur-Alzette (LU)

(72) Inventors: Marc Weydert, Bertrange (LU); Alexander Shaplov, Belvaux (LU); Luc Mertens, Wormeldange-Haut (LU); Abdullah Gunaydin, Esch-sur-Aizette (LU); Clément Mugemana, Arlon (BE)

(73) Assignees: THE GOODYEAR TIRE & RUBBER COMPANY, Akron, OH (US); LUXEMBOURG INSTITUTE OF SCIENCE AND TECHNOLOGY (LIST), Esch-sur-Alzette (LU)

( * ) Notice: Subject to any disclaimer, the term of this patent is extended or adjusted under 35 U.S.C. 154(b) by 232 days.

(21) Appl. No.: 17/109,891

(22) Filed: Dec. 2, 2020

(65) Prior Publication Data
US 2021/0163721 A1 Jun. 3, 2021

Related U.S. Application Data

(60) Provisional application No. 62/942,926, filed on Dec. 3, 2019.

(51) Int. Cl.
*C08L 9/06* (2006.01)
*B60C 1/00* (2006.01)

(52) U.S. Cl.
CPC .............. *C08L 9/06* (2013.01); *B60C 1/0016* (2013.01); *B60C 1/0025* (2013.01);
(Continued)

(58) Field of Classification Search
CPC . C08L 9/06; C08L 91/00; C08L 33/10; B60C 1/0016; B60C 1/0025;
(Continued)

(56) References Cited

U.S. PATENT DOCUMENTS

| | | | |
|---|---|---|---|
| 8,759,451 B2 | 6/2014 | Mruk et al. | |
| 2012/0085476 A1* | 4/2012 | Donckels | B60C 15/06 |
| | | | 152/557 |

(Continued)

FOREIGN PATENT DOCUMENTS

| | | | |
|---|---|---|---|
| EP | 2 070 728 | * | 6/2009 |
| JP | 4354874 | * | 10/2009 |

OTHER PUBLICATIONS

Machine translation of JP 4354874 (Year: 2009).*
(Continued)

*Primary Examiner* — Doris L Lee
(74) *Attorney, Agent, or Firm* — Alvin T. Rockhill

(57) ABSTRACT

In a first aspect of the present invention, a rubber composition is provided, comprising at least one rubber, at least one filler, at least one thermoplastic polymer, wherein the thermoplastic polymer is a poly alkylacrylate, and wherein the alkylacrylate comprises a polycyclic substituent at its single bonded oxygen atom. In another aspect of the invention, an article of manufacture such as a tire, a power transmission belt, a hose, a track, an air sleeve, and a conveyor belt is provided which comprises the rubber composition in accordance with the first aspect.

20 Claims, 1 Drawing Sheet

(52) U.S. Cl.
CPC .... *B60C 1/0041* (2013.01); *B60C 2001/0058* (2013.01); *B60C 2001/0066* (2013.01)

(58) Field of Classification Search
CPC .......... B60C 1/0041; B60C 2001/0058; B60C 2001/0066; C08K 3/04; C08K 5/09; C08K 5/18; C08K 3/22; C08K 13/00
See application file for complete search history.

(56) References Cited

U.S. PATENT DOCUMENTS

| | | |
|---|---|---|
| 2013/0072621 A1 | 3/2013 | Abad et al. |
| 2013/0165589 A1 | 6/2013 | Mruk et al. |
| 2014/0343190 A1 | 11/2014 | Custodero et al. |
| 2014/0350187 A1 | 11/2014 | Ito et al. |
| 2017/0210887 A1* | 7/2017 | Vasseur .................... C08K 3/22 |
| 2018/0291125 A1* | 10/2018 | Anderson ................. C08F 8/02 |

OTHER PUBLICATIONS

Thomas, Leonard C. "Use of multiple heating rate DSC and modulated temperature DSC to detect and analyze temperature-time-dependent transitions in materials." American Laboratory 33.1 (2001): 26-31. (Year: 2001).*

Fuchise et al (Precise synthesis of poly(1-adamantyl methacrylate) by atom transfer radical polymerization, Polymer Journal, 40, 626-631, (2010) (Year: 2010).*

Extended European Search Report for European Patent Application No. 20210938.5 dated Mar. 5, 2021 (the European counterpart to the subject patent application).

\* cited by examiner

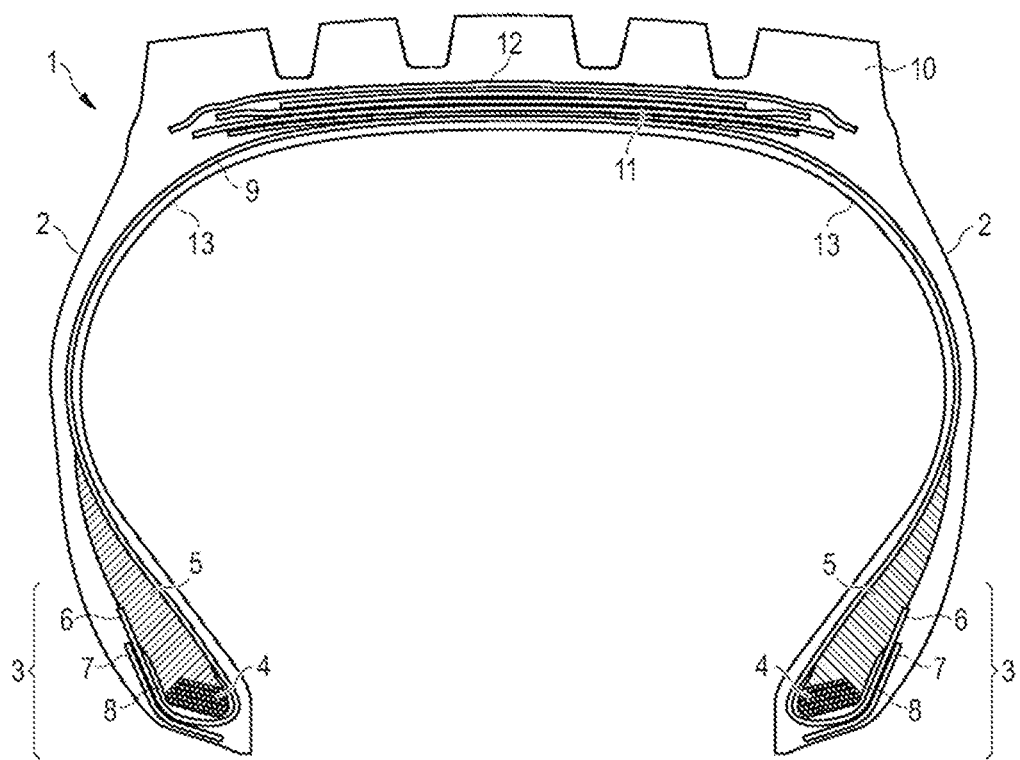

RUBBER COMPOSITION AND AN ARTICLE OF MANUFACTURE COMPRISING A RUBBER COMPOSITION

This application claims benefit of U.S. Provisional Patent Application Ser. No. 62/942,926, filed on Dec. 3, 2019. The teachings of United States Provisional Patent Application Ser. No. 62/942,926 are incorporated herein by reference in their entirety.

FIELD OF THE INVENTION

The present invention is directed to a rubber composition, in particular a rubber composition for a tire. Moreover, the present invention is directed to an article of manufacture selected from a tire, a power transmission belt, a hose, a track, an air sleeve, and a conveyor belt comprising such a rubber composition or a component comprising the rubber composition.

BACKGROUND

Rubber compositions, in particular for tires but not limited to such an application, shall meet a plurality of requirements such as durability, stiffness, elasticity, low hysteresis and many more. In order to further improve the properties of rubber compositions for some applications, the use of ultra-high molecular weight polyethylene (UHMWPE) has been suggested in the past. However, while the use of polyethylene material has helped in some applications to improve rubber properties such as stiffness, it has also some disadvantages. For instance, one issue is its relatively low melting point in the order of 135° C. in the rubber composition. Another downside of polyethylene consists in that it is difficult to process and disperse in rubber formulations, thereby limiting the desired reinforcement effects due to relatively poor dispersion. Moreover, stiffness can also be improved by provision of suitable filler materials. However, increasing the amount of such fillers to high degrees, may also have multiple disadvantages such as an increase of weight, problems during mixing and others. While there have been many approaches for providing rubber compositions with high stiffness, significant room for improvement is left.

SUMMARY OF THE INVENTION

A first object of the invention may be to provide an advanced rubber composition, in particular for tire components.

Another object of the invention may be to provide an advanced high stiffness rubber composition, in particular which maintains stiffness properties substantially beyond 120° C.

Another object of the invention may be to provide an advanced high stiffness rubber compound, in particular with limited weight.

The present invention is defined by the independent claims. Further preferred embodiments are mentioned in the dependent claims and in the summary and description herein below.

In one aspect of the invention, a rubber composition, in particular for a tire or tire (rubber) component is provided, wherein the rubber composition comprises at least one elastomer, at least one filler and at least one thermoplastic polymer, wherein the thermoplastic polymer is a poly alkylacrylate, and wherein the alkylacrylate comprises a polycyclic substituent at its single bonded oxygen atom. Provision of such a poly alkylacrylate reinforces the rubber compound, wherein its substituents limit significantly the chain mobility within the material.

In an embodiment, the poly alkylacrylate has the following structure:

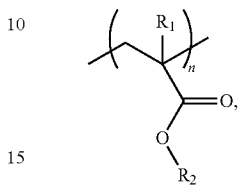

with n being the number of the alkylacrylate monomers in the poly alkylacrylate, $R_1$ being an alkyl such as $CH_3$ (methyl) or $C_2H_5$ (ethyl) and $R_2$ being a polycyclic hydrocarbon material/group or, in other words, a hydrocarbon substituent at the OH (hydroxyl) group of the (alkyl)acrylate/acrylic group. Such materials have been found to be even more desirable because of the bulky sub stituent $R_2$ which may for instance further help to improve stiffness of the compound. Moreover, the poly alkylacrylate with its bulky side groups/substituents helps to enhance processability (also due to its amorphous nature) and has also a relatively high heat resistance. In particular, there may also be less forces resulting in phase separation during mixing which may help to achieve better dispersion.

In general, the suggested poly alkylacrylates may provide a better reinforcement of the rubber matrix with limited hysteresis. Also, the suggested alkylacrylates are relatively light weight materials compared to silica or carbon black when considering achieving a similar degree of reinforcement. In particular, such properties, or a combination thereof, may not be easily achieved by the provision of more carbon black or silica in the rubber composition. Adding more of such materials may increase weight and/or hysteresis. Moreover, it could make mixing more difficult or change also other properties of the compound in an undesired manner.

In still another embodiment, the alkylacrylate has one of a bicyclic substituent and a tricyclic substituent. In still another embodiment, the alkylacrylate has a hydrocarbon substituent comprising at least seven carbon atoms, optionally at least eight carbon atoms, with at least five (optionally at least six) of the carbon atoms cyclically arranged. These have turned out to be desirable materials.

In another embodiment, the poly alkylacrylate is one of poly(isobornyl methacrylate) (also referred to herein as PIBOMA) and poly(adamantyl methacrylate) (also referred to herein as PADAM). These materials have been identified by the inventors as two materials with most desirable properties, in particular in terms of reinforcement. Moreover, the bulky side groups or substituents help to enhance processability and provide a relatively high glass transition temperature which may be an indicator for the heat resistance of the material in the vulcanized compound.

In still another embodiment the poly alkylacrylate has one or more of the following structures (with n being preferably an integer equal to and/or greater than 1):

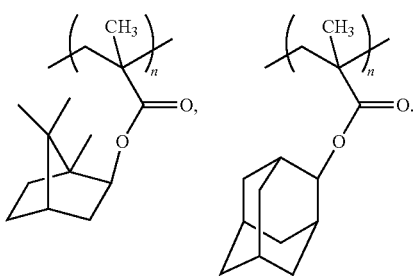

In general, the polymers as such are commercially available and/or can be prepared by free radical, ionic, coordination, reversible addition-fragmentation chain transfer (RAFT) or atom transfer radical (ATRP) polymerization, for example.

In yet another embodiment, the molar weight Mn of the thermoplastic polymer is at least 20,000 g/mol, optionally at least 30,000 g/mol. It has been discovered that such a minimum weight may be desirable to observe a greater effect in reinforcement and avoid a too low softening and/or melting point. Mn and/or Mw can be suitably determined by GPC according to ASTM standard D5296, in particular using polystyrene calibration standards.

In still another embodiment, the molar weight Mn of the thermoplastic polymer is less than 2,000,000 g/mol, or preferably less than 1,000,000 g/mol.

In still another embodiment, the poly dispersity index Mw/Mn of the poly alkylacrylate is at least 1.1, preferably at least 1.5 and optionally more than 1.8 but preferably less than 5.

In still another embodiment, the glass transition temperature Tg of the poly alkylacrylate is at least 140° C., preferably at least 150° C. and optionally between 170° C. and 250° C. Tg can be suitably determined as a peak midpoint by a differential scanning calorimeter (DSC) at a temperature rate of increase of 10° C. per minute, according to ASTM D3418 or equivalent.

In yet another embodiment, the rubber composition comprises 100 phr of one or more diene/diene-based rubbers, from 20 to 120 phr of a filler, and from 5 to 50 phr of the poly alkylacrylate. Such filler contents and poly alkylacrylate contents have been found to be most desirable.

In another embodiment, the filler is one of carbon black, silica and pre-silanized silica.

In still another embodiment, the elastomer (or rubber), or the diene/diene-based rubbers are one or more of styrene butadiene rubber, polybutadiene (rubber), solution polymerized styrene butadiene rubber, emulsion polymerized styrene butadiene rubber, natural rubber and synthetic polyisoprene (rubber).

In still another embodiment, the rubber composition comprises from 10 phr to 40 phr poly alkylacrylate, optionally from 15 phr to 35 phr poly alkylacrylate. These ranges have been found to be most desirable by the inventors.

The rubber composition may include at least one or at least one additional diene-based rubber. Representative synthetic polymers are the homopolymerization products of butadiene and its homologues and derivatives, for example methylbutadiene, dimethylbutadiene and pentadiene as well as copolymers such as those formed from butadiene or its homologues or derivatives with other unsaturated monomers. Among the latter are acetylenes, for example vinyl acetylene, olefins, for example isobutylene, which copolymerizes with isoprene to form butyl rubber; vinyl compounds, for example acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are natural rubber, synthetic polyisoprene, polybutadiene and SBR.

In one aspect, the rubber is preferably of at least two of diene-based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (ESBR) might be used having a relatively conventional styrene content of 20 to 28 percent bound styrene or, for some applications, an ESBR having a medium to relatively high bound styrene content, namely a bound styrene content of 30 to 45 percent. By emulsion polymerization prepared ESBR, it is meant that styrene and 1,3-butadiene are copolymerized as an aqueous emulsion. Such are well known to those skilled in such art. The bound styrene content can vary, for example, from 5 to 50 percent. In one aspect, the ESBR may also contain acrylonitrile to form a terpolymer rubber, as ESBAR, in amounts, for example, of 2 to 30 weight percent bound acrylonitrile in the terpolymer. Emulsion polymerization prepared styrene/butadiene/acrylonitrile copolymer rubbers containing 2 to 40 weight percent bound acrylonitrile in the copolymer are also contemplated as diene-based rubbers for use in this invention.

In another embodiment, solution polymerization prepared SBR (SSBR) may be used. Such an SSBR may for instance have a bound styrene content in a range of 5 to 50, preferably 9 to 36, percent. The SSBR can be conveniently prepared, for example, by anionic polymerization in an inert organic solvent. More specifically, the SSBR can be synthesized by copolymerizing styrene and 1,3-butadiene monomer in a hydrocarbon solvent utilizing an organo lithium compound as the initiator.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content. This content may apply also to other cis 1,4 rubbers or synthetic poly-isoprenes mentioned herein.

The cis 1,4-polyisoprene and cis 1,4-polyisoprene natural rubber are well known to those having skill in the rubber art.

In one embodiment, cis 1,4-polybutadiene rubber (BR) is used. Suitable polybutadiene rubbers may be prepared, for example, by organic solution polymerization of 1,3-butadiene. The BR may be conveniently characterized, for example, by having at least a 90 percent cis 1,4-content and a glass transition temperature Tg in a range of from −95 to −105° C. Suitable polybutadiene rubbers are available commercially, such as Budene® 1207, Budene® 1208, or Budene® 1223 from The Goodyear Tire & Rubber Company. These high cis-1,4-polybutadiene rubbers can for instance be synthesized utilizing nickel catalyst systems which include a mixture of (1) an organonickel compound, (2) an organoaluminum compound, and (3) a fluorine containing compound as described in U.S. Pat. Nos. 5,698,643 and 5,451,646, which are incorporated herein by reference.

In one embodiment, a synthetic or natural polyisoprene rubber may be used.

The term "phr" as used herein, and according to conventional practice, refers to "parts by weight of a respective material per 100 parts by weight of rubber, or elastomer." In general, using this convention, a rubber composition is comprised of 100 parts by weight of rubber/elastomer. The claimed composition may comprise other rubbers/elastomers than explicitly mentioned in the claims, provided that the phr value of the claimed rubbers/elastomers is in accordance with claimed phr ranges and the amount of all rubbers/elastomers in the composition results in total in 100 parts of rubber. In an example, the composition may further comprise from 1 to 10 phr, optionally from 1 to 5 phr, of one or more additional diene-based rubbers, such as SBR, SSBR, ESBR, PBD/BR, NR and/or synthetic polyisoprene. In another example, the composition may include less than 5, preferably less than 3, phr of an additional diene-based rubber or be also essentially free of such an additional diene-based rubber. The terms "compound" and "composition" may be used herein interchangeably, unless indicated otherwise.

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom.

The rubber composition may preferably include from 50 to 150 phr of silica. In another embodiment, from 60 to 120 phr of silica may be used.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g. sodium silicate.

Such conventional silicas might be characterized, for example, by having a BET surface area as measured using nitrogen gas. In one embodiment, the BET surface area may be in the range of 40 to 600 square meters per gram. In another embodiment, the BET surface area may be in a range of 80 to 300 square meters per gram. The BET method of measuring surface area is described in the Journal of the American Chemical Society, Volume 60, Page 304 (1930).

The conventional silica may also be characterized by having a dibutylphthalate (DBP) absorption value in a range of 100 to 400, alternatively 150 to 300.

The conventional silica might be expected to have an average ultimate particle size, for example in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 315G, EZ160G, etc; silicas available from Solvay, with, for example, designations of Z1165MP and Premium200MP, etc. and silicas available from Evonik AG with, for example, designations VN2 and Ultrasil 6000GR, 9100GR, etc.

Commonly employed carbon blacks can be used as a conventional filler in an amount ranging from 10 to 150 phr. In another embodiment, from 20 to 80 phr of carbon black may be used. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^3$/100 g.

Other fillers may be used in the rubber composition including, but not limited to, particulate fillers including ultra-high molecular weight polyethylene (UHMWPE), crosslinked particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639. Such other fillers may be used in an amount ranging from 1 to 30 phr.

In one embodiment, the rubber composition may contain a conventional sulfur containing organosilicon compound. Examples of suitable sulfur containing organosilicon compounds are of the formula:

$$Z\text{-Alk-}S_n\text{-Alk-}Z \qquad \mathrm{I}$$

in which Z is selected from the group consisting of

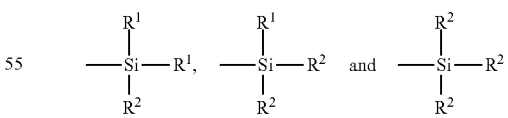

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl)

disulfide and/or 3,3'-bis(triethoxysilylpropyl) tetrasulfide. Therefore, as to formula I, Z may be

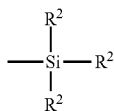

where $R^2$ is an alkoxy of 2 to 4 carbon atoms, alternatively 2 carbon atoms; Alk is a divalent hydrocarbon of 2 to 4 carbon atoms, alternatively with 3 carbon atoms; and n is an integer of from 2 to 5, alternatively 2 or 4.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)—S—CH_2CH_2CH_2Si(OCH_2CH_3)_3$, which is available commercially as NXT™ from Momentive Performance Materials.

In another embodiment, suitable sulfur containing organosilicon compounds include those disclosed in United States Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition (or in other words sulfur-vulcanizable rubber composition) would be compounded by methods generally known in the rubber compounding art, such as mixing the various sulfur-vulcanizable constituent rubbers with various commonly used additive materials such as, for example, sulfur donors, curing aids such as activators and retarders and processing additives, such as oils resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise 0.5 to 10 phr, usually 1 to 5 phr. Typical amounts of processing aids comprise 1 to 50 phr. Typical amounts of antioxidants comprise 1 to 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants comprise 1 to 5 phr. Typical amounts of fatty acids, if used, which can include stearic acid comprise 0.5 to 3 phr. Typical amounts of waxes comprise 1 to 5 phr. Often microcrystalline waxes are used. Typical amounts of peptizers comprise 0.1 to 1 phr. Typical peptizers may be, for example, pentachlorothiophenol and dibenzamidodiphenyl disulfide.

Accelerators may be used to control the time and/or temperature required for vulcanization and to improve the properties of the vulcanizate. In one embodiment, a single accelerator system may be used, i.e., primary accelerator. The primary accelerator(s) may be used in total amounts ranging from 0.5 to 10 or 0.5 to 4, alternatively 0.8 to 1.5, phr. In another embodiment, combinations of a primary and a secondary accelerator might be used with the secondary accelerator being used in smaller amounts, such as from 0.05 to 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound. Suitable guanidines include dipheynylguanidine and the like. Suitable thiurams include tetramethylthiuram disulfide, tetraethylthiuram disulfide, and tetrabenzylthiuram disulfide.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) of the preceding non-productive mix stage (s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

In another aspect of the invention, an article of manufacture is provided which may preferably be selected from a tire, a power transmission belt, a hose, a track, an air sleeve, and a conveyor belt. The article comprises a rubber composition in accordance with one or more of the above embodiments or elements thereof. Thus, the article of manufacture has a rubber composition comprising at least one elastomer, at least one filler, at least one thermoplastic polymer, wherein the thermoplastic polymer is a poly alkylacrylate, and wherein the alkylacrylate comprises a polycyclic substituent at its single bonded oxygen atom.

In an embodiment, a tire comprises at least one component made of the rubber composition, wherein the component is at least one of: a carcass ply, a belt ply, an overlay ply, an apex, a sidewall, a tread, a chipper, a flipper, an inner liner, a chafer, a ply strip, a shoulder, an undertread, a tread cap and a tread base. In principle, the composition may be used in multiple of said tire components.

In another embodiment, said component is selected from at least one of: a carcass ply, a belt ply, an apex, a sidewall, a chipper, a flipper, a chafer and a shoulder. In other words, the rubber composition may be of particular interest in components requiring a high stiffness. The tread or parts thereof are not of interest in this embodiment.

The tire, in particular the pneumatic tire, may be a race tire, passenger tire, aircraft tire, agricultural tire, earthmover tire, off-the-road tire, truck tire, and the like. In one embodiment, the tire is a passenger or truck tire. The tire may also be a radial or bias tire. Vulcanization of the rubber composition or the (pneumatic) tire may be generally carried out at conventional temperatures ranging from 100° C. to 200° C. In one embodiment, the vulcanization is conducted at temperatures ranging from 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

Advantages of the article comprising a rubber composition in accordance with an aspect of the invention or one of its embodiments or combinations thereof have already been indicated above.

It is emphasized that one or more embodiments, or features thereof, maybe be combined with each other within the scope of the present invention.

BRIEF DESCRIPTION OF THE DRAWINGS

The structure, operation and advantages of the invention will become more apparent upon contemplation of the following description taken in conjunction with the accompanying drawing, wherein:

FIG. 1 shows a schematic cross section through an example tire.

DETAILED DESCRIPTION OF THE EMBODIMENTS

FIG. 1 is a schematic cross-section of a tire 1. The tire 1 has a tread 10, an inner liner 13, a belt structure comprising four belt plies 11, a carcass ply 9, two sidewalls 2, and two bead regions 3 comprising bead filler apexes 5 and beads 4. The example tire 1 is suitable, for example, for mounting on a rim of a vehicle, e.g. a truck or a passenger car. As shown in FIG. 1, the belt plies 11 may be covered by an overlay ply 12. The carcass ply 9 includes a pair of axially opposite end portions 6, each of which is associated with a respective one of the beads 4. Each axial end portion 6 of the carcass ply 9 may be turned up and around the respective bead 4 to a position to anchor each axial end portion 6. One or more of the carcass ply 9, belt plies 11 and overlay ply 12 comprise a rubber composition in accordance with the invention and may have a plurality of substantially parallel reinforcing members made of a fabric material such as polyester, rayon, or similar suitable organic polymeric compounds or made of metal wire. The turned-up portions 6 of the carcass ply 9 may engage the axial outer surfaces of two flippers 8 and axial inner surfaces of two chippers 7. As shown in FIG. 1, the example tread 10 may have four circumferential grooves, each groove essentially defining a U-shaped opening in the tread 10. The main portion of the tread 10 may be formed of one or more tread compounds, which may be any suitable tread compound or compounds.

While the embodiment of FIG. 1 suggests a plurality of tire components including for instance apexes 5, chippers 7, flippers 8 and overlay 12, such components are all not mandatory for the invention. Also, the turned-up end of the carcass ply 9 is not necessary for the invention or may pass on the opposite side of the bead area 3 and end on the axially inner side of the bead 4 instead of the axially outer side of the bead 4. The tire could also have, for instance, more or less than four grooves. It shall be emphasized that the present invention focuses on the use of a thermoplastic polymer which is a poly alkylacrylate in a rubber composition. Thus, the description of FIG. 1 is merely to be understood as an example without necessarily limiting the present invention.

In an example of the invention, a rubber composition, such as in the tire 1, comprises an elastomer, in particular a SSBR, and a filler which may comprise carbon black, silica or combinations thereof. In accordance with the invention, the rubber composition comprises also a thermoplastic polymer which is a poly alkylacrylate, wherein the alkylacrylate comprises a polycyclic substituent at its single bonded oxygen atom.

Table 1 shows three control samples comprising SSBR rubber, filler, oil, stearic acid, antioxidants, waxes, zinc oxide, sulfur as well as curing accelerators. Control Sample 1 comprises no thermoplastic polymer and is mainly reinforced by means of its carbon black filler. In contrast, Control Sample 2 (which is also not in accordance with the present invention) comprises additional 20 phr of polyethylene (PE) which is used for reinforcing purposes. Control Sample 3 comprises silica and silica coupler instead of carbon black but no PE. The Inventive Examples do not comprise PE either. Inventive Example 1 comprises instead of PE 20 phr poly(isobornyl methacrylate) (PIBOMA) having a molecular weight of 50k and Inventive Example 2 comprises instead of PE 20 phr PIBOMA 277k. Inventive Example 3 comprises poly(adamantyl methacrylate) (PADAM) with a molecular weight of 38 k g/mol. Both, PIBOMA and PADAM are supposed to help reinforcing the rubber compound. Inventive Example 4 comprises silica in combination with the PIBOMA 277k.

TABLE 1

|  | [phr] | | | | | | |
|---|---|---|---|---|---|---|---|
|  | Control | | | Inventive | | | |
| Material | 1 | 2 | 3 | Example 1 | Example 2 | Example 3 | Example 4 |
| SSBR[1] | 100 | 100 | 100 | 100 | 100 | 100 | 100 |
| Carbon Black | 50 | 50 | 0 | 50 | 50 | 50 | 0 |
| Silica | 0 | 0 | 65 | 0 | 0 | 0 | 65 |
| Oil[2] | 4 | 4 | 26 | 4 | 4 | 4 | 26 |
| PIBOMA 50k[3] | 0 | 0 | 0 | 20 | 0 | 0 | 0 |
| Coupling agent[4] | 0 | 0 | 6.5 | 0 | 0 | 0 | 6.5 |
| PIBOMA 277k[5] | 0 | 0 | 0 | 0 | 20 | 0 | 20 |

TABLE 1-continued

|  | [phr] | | | | | | |
|---|---|---|---|---|---|---|---|
|  | Control | | | Inventive | | | |
| Material | 1 | 2 | 3 | Example 1 | Example 2 | Example 3 | Example 4 |
| PADAM 38k[6] | 0 | 0 | 0 | 0 | 0 | 20 | 0 |
| PE[7] | 0 | 20 | 0 | 0 | 0 | 0 | 0 |
| Stearic Acid | 2 | 2 | 3 | 2 | 2 | 2 | 3 |
| Antioxidants[8] | 2.5 | 2.5 | 2.5 | 2.5 | 2.5 | 2.5 | 2.5 |
| Waxes | 1.5 | 1.5 | 0 | 1.5 | 1.5 | 1.5 | 0 |
| MBT[9] | 0 | 0 | 0.3 | 0 | 0 | 0 | 0.3 |
| Zinc Oxide | 2.5 | 2.5 | 2.5 | 2.5 | 2.5 | 2.5 | 2.5 |
| Sulfur | 1.5 | 1.5 | 1.1 | 1.5 | 1.5 | 1.5 | 1.1 |
| Accelerators[10] | 2.3 | 2.3 | 5.5 | 2.3 | 2.3 | 3 | 5.5 |

[1]Solution styrene butadiene rubber as Sprintan™ SLR 4602 of Trinseo™ company
[2]TDAE oil
[3]Poly(isobornyl methacrylate) with 50,000 g/mol molecular weight
[4]Bis-(3-triethyoxysilylpropyl) disulfide
[5]Poly(isobornyl methacrylate) with 277,000 g/mol molecular weight
[6]Poly(adamantyl methacrylate) with 38,000 g/mol molecular weight
[7]Ultra-high molecular weight polyethylene (UHMWPE) with 4,700,000 g/mol molecular weight
[8]as Phenylene diamine
[9]as 2-Mercaptobenzothiazole
[10]as Sulfenamides and diphenylguanidine Table 2 shows measured storage modulus (E') values for the compositions listed already in Table 1, wherein the storage modulus can be considered as a stiffness indicator. In particular, Table 2 shows an improved reinforcement, especially in high temperature regions, for instance at 150° C. or above. The samples with only carbon black or silica (and no thermoplastic reinforcement) have storage module values below all other materials shown which comprise a thermoplastic material. When considering the storage modulus in dependency of the temperature of the polyethylene-comprising composition, the reinforcement is relatively good until the softening point of the polyethylene but drops then considerably around its melting point of about 135° C. which can be seen in the 150° C. and higher value in Table 2. The poly(isobornyl alkylacrylate) and poly(adamantyl alkylacrylate) Inventive Examples do not show that sharp dropping behavior. In particular, the storage modulus value drops for the PE sample by almost 40% from 100° C. to 150° C., whereas the drop for the Inventive Examples is at about 10% or less in the same temperature range. Moreover, the storage modulus at 150° C. and above is higher for the Inventive Examples 1, 2, 3 and 4 than the values of Control 2, i.e. the PE sample.

TABLE 2

|  | Storage Modulus E' [MPa]* | | | | | | |
|---|---|---|---|---|---|---|---|
|  | Control | | | Inventive | | | |
| Temperature | 1 | 2 | 3 | Example 1 | Example 2 | Example 3 | Example 4 |
| 30° C. | 15.0 | 26.5 | 12.5 | 17.7 | 26.0 | 21.5 | 14.8 |
| 50° C. | 12.0 | 20.0 | 10.7 | 14.3 | 20.5 | 17.0 | 12.9 |
| 100° C. | 9.5 | 13.3 | 8.9 | 10.8 | 15.1 | 13.7 | 10.8 |
| 150° C. | 8.9 | 8.6 | 8.1 | 9.7 | 13.6 | 13.0 | 10.0 |
| 180° C. | 8.6 | 8.1 | 7.8 | 9.6 | 12.7 | 12.8 | 9.4 |

*Dynamic Mechanical Thermal Analysis (DMTA) measurements have been carried out for cured compounds/compositions on films (typically length x width x thickness = 10 x 6 x 2 (mm)) with a DMA 242 C model (Netzsch, Germany) operating in tension mode (strain between 0.05 and 0.07%, pretension: $10^{-2}$ N). Experiments were performed at 1 Hz frequency with a heating rate of 2° C. $min^{-1}$ from −180 to 180° C.

Below Table 3 shows glass transition temperatures for the thermoplastic polymers used in the compositions discussed in the context of Tables 1 and 2 (i.e. not the glass transition temperature of the whole rubber compositions). Glass transition temperatures of the thermoplastic polymers used in the Inventive Examples are significantly higher than the softening point of the UHMWPE used in control sample 2 which is at about 135° C.

TABLE 3

| Glass Transition Temperature Tg | | | |
|---|---|---|---|
| Inventive Example 1 | Inventive Example 2 | Inventive Example 3 | Inventive Example 4 |
| 195° C. | 195° C. | 235° C. | 195° C. |

Variations in the present invention are possible in light of the provided description. While certain representative embodiments, examples and details have been shown for the purpose of illustrating the subject invention, it will be apparent to those skilled in this art that various changes and modifications can be made therein without departing from the scope of the invention. It is, therefore, to be understood that changes may be made in the particular example embodiments described which will be within scope of the invention as defined by the following appended claims.

In any case, the above described embodiments and examples shall not be understood in a limiting sense. In particular, the features of the above embodiments may also be replaced or combined with one another.

The invention claimed is:

1. A rubber composition, the rubber composition comprising:
   at least one elastomer,
   at least one filler,
   at least one thermoplastic polymer,
   wherein the thermoplastic polymer is a poly alkylacrylate, wherein the glass transition temperature of the poly alkylacrylate is at least 195° C. as measured at a rate of temperature increase of 10° C. per minute, wherein the molar weight Mn of the polyalkylacrylate is at least 20,000 g/mol, and wherein the polyalkylacrylate consists of repeat units having the structural formula:

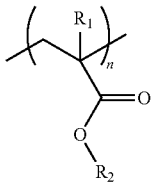

wherein n is an integer which represents the number of the number of repeat units in the poly alkylacrylate; wherein $R_1$ represents the alkyl group; and wherein $R_2$ represents a polycyclic hydrocarbon group.

2. The rubber composition of claim 1, wherein $R_1$ is a member selected from the group consisting of $CH_3$ and $C_2H_5$.

3. The rubber composition of claim 1, wherein $R_2$ is a bicyclic substituent or a tricyclic substituent.

4. The rubber composition of claim 1, wherein $R_2$ is a hydrocarbon substituent comprising at least seven carbon atoms, with at least five of the carbon atoms cyclically arranged.

5. The rubber composition of claim 1, wherein the poly alkylacrylate of: consists of poly(isobornyl methacrylate).

6. The rubber composition of claim 1, wherein the molar weight Mn of the poly alkylacrylate is less than 2,000,000 g/mol, and wherein the polydispersity index Mw/Mn of the poly alkylacrylate is at least 1.5.

7. The rubber composition of claim 1, wherein the glass transition temperature $T_g$ of the poly alkylacrylate ranges from 195° C. to 250° C.

8. The rubber composition of claim 1, wherein the rubber composition comprises:
100 phr of the elastomer,
from 20 to 120 phr of the filler, and
from 5 to 50 phr of the poly alkylacrylate.

9. The rubber composition of claim 1, wherein the filler is a pre-silanized silica.

10. The rubber composition of claim 1, wherein the elastomer is one or more of: styrene butadiene rubber, polybutadiene, solution polymerized styrene butadiene rubber, emulsion polymerized styrene butadiene rubber, natural rubber and synthetic polyisoprene.

11. The rubber composition of claim 1, wherein the rubber composition comprises from 10 phr to 40 phr of the poly alkylacrylate.

12. The rubber composition of claim 1, wherein the wherein the glass transition temperature of the poly alkylacrylate is within the range of 210° C. to 250° C. as measured at a rate of temperature increase of 10° C. per minute.

13. The rubber composition of claim 1, wherein the polyalkylacrylate consists of repeat units of the structural formula:

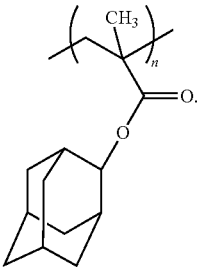

14. The rubber composition of claim 1 wherein the poly alkylacrylate is present in the rubber composition at a level which is within the range of 15 phr to 25 phr.

15. The rubber composition of claim 1, wherein the poly alkylacrylate consists of poly(adamantyl methacrylate).

16. A tire which includes a tread, an innerliner, a belt structure, a carcass ply, two sidewalls, two bead regions, two beads and two bead filler apexes, wherein the bead filler apexes are comprised of the rubber composition of claim 1.

17. A tire which includes a tread, an innerliner, a belt structure, a carcass ply, two sidewalls, two bead regions, two beads, two bead filler apexes, and two flippers, wherein the flippers are comprised of the rubber composition of claim 1.

18. A tire which includes a tread, an innerliner, a belt structure, a carcass ply, two sidewalls, two bead regions, two beads, two bead filler apexes, and two chippers, wherein the chippers are comprised of the rubber composition of claim 1.

19. A tire which includes a tread, an innerliner, a belt structure, a carcass ply, two sidewalls, two bead regions, two beads, two bead filler apexes, two flippers, and two chippers, wherein the apexes, flippers, and chippers are comprised of the rubber composition of claim 1.

20. The tire of claim 19, wherein the polyalkylacrylate consists of repeat units of the structural formula:

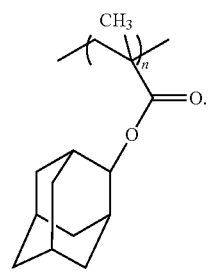

* * * * *